United States Patent
Axmon et al.

(10) Patent No.: US 9,854,488 B2
(45) Date of Patent: Dec. 26, 2017

(54) METHOD AND WIRELESS COMMUNICATION DEVICE FOR IDLE MODE MOBILITY MANAGEMENT

(71) Applicant: Telefonaktiebolaget L M Ericsson (publ), Stockholm (SE)

(72) Inventors: Joakim Axmon, Kavlinge (SE); Marcus Davidsson, Lund (SE); Dandan Hao, Beijing (CN); Ali Nader, Malmo (SE); Jan Wichert, Svedala (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/418,280

(22) PCT Filed: Mar. 18, 2014

(86) PCT No.: PCT/CN2014/073638
§ 371 (c)(1),
(2) Date: Jan. 29, 2015

(87) PCT Pub. No.: WO2015/139216
PCT Pub. Date: Sep. 24, 2015

(65) Prior Publication Data
US 2016/0373981 A1 Dec. 22, 2016

(51) Int. Cl.
*H04W 36/00* (2009.01)
*H04W 36/14* (2009.01)

(52) U.S. Cl.
CPC ....... *H04W 36/14* (2013.01); *H04W 36/0022* (2013.01); *H04W 36/0061* (2013.01)

(58) Field of Classification Search
CPC ......... H04W 36/0022; H04W 36/0055; H04W 36/0061; H04W 36/0066; H04W 36/0072;
(Continued)

(56) References Cited

U.S. PATENT DOCUMENTS

| | | | | |
|---|---|---|---|---|
| 2010/0022242 A1* | 1/2010 | Nizri | ..................... | H04W 60/04 455/435.2 |
| 2011/0117916 A1* | 5/2011 | Dahlen | ................. | H04W 48/02 455/436 |

(Continued)

FOREIGN PATENT DOCUMENTS

| | | |
|---|---|---|
| CN | 101867968 A | 10/2012 |
| CN | 101925147 A | 12/2012 |

(Continued)

OTHER PUBLICATIONS

PCT International Search Report, dated Dec. 23, 2014, in connection with International Application No. PCT/CN2014/073638, all pages.

(Continued)

*Primary Examiner* — Temica M Beamer
(74) *Attorney, Agent, or Firm* — Laffler Intellectual Property Law, PLLC

(57) ABSTRACT

The embodiments disclose a method of a wireless communication device adapted to operate in compliance with a first radio access technology in association with a first network and in compliance with a second radio access technology in association with a second network. The method comprises reading a first information comprised in a first signal received from a first network node of the first network using the first radio access technology; and if the first information comprises a first list of neighboring cells for the second radio access technology, using the first list of neighboring cells to provide idle mode mobility management for the second radio access technology in the second network. The embodiments also disclose a wireless communication device performing the method.

31 Claims, 7 Drawing Sheets

(58) Field of Classification Search
CPC ......... H04W 36/0077; H04W 36/0083; H04W 36/08; H04W 36/16
USPC ................ 455/422.1, 435.2, 437, 438, 552.1
See application file for complete search history.

(56) References Cited

U.S. PATENT DOCUMENTS

| | | |
|---|---|---|
| 2011/0183694 A1 | 7/2011 | Han |
| 2011/0195714 A1* | 8/2011 | Sawinathan ........ H04W 60/005 455/435.1 |
| 2011/0216732 A1* | 9/2011 | Maeda .................... H04W 4/08 370/329 |
| 2013/0084858 A1 | 4/2013 | Ramasamy et al. |
| 2013/0090137 A1* | 4/2013 | Krishnamoorthy ... H04W 68/02 455/458 |
| 2013/0157662 A1 | 6/2013 | Han et al. |
| 2013/0189972 A1* | 7/2013 | Martin .............. H04W 36/0088 455/423 |
| 2016/0249266 A1* | 8/2016 | Kim ........................ H04W 4/06 |

FOREIGN PATENT DOCUMENTS

| | | |
|---|---|---|
| EP | 2302971 A2 | 3/2011 |
| EP | 2670198 A1 | 12/2013 |
| WO | 2011/162881 A1 | 12/2011 |
| WO | 2012152670 A1 | 11/2012 |

OTHER PUBLICATIONS

PCT Written Opinion, dated Dec. 23, 2014, in connection with International Application No. PCT/CN2014/073638, all pages.
3GPP Technical Specification 36.331, V12.0.0 "Radio Resource Control (RRC); Protocol specification (Release 12)", Section 5.2.2 "System information acquisition", Dec. 2013, pp. 1-12, 28-35.
European Search Report, dated Nov. 7, 2017, in connection with EP Application No. 14886004.2, 14 pages.
3GPP TSG-RAN WG2 Meeting #63, R2-083939, Jeju, Korea, Aug. 18-22, 2008, Alignment of Neighbour Cell Lists and UE-specific priorities, Ericsson, pp. 1-7.
3GPP TSG GERAN, Meeting No. 2, GP-000824, Norrtalje, Sverige, Nov. 6-10, 2000, Editorials and corrections to GSM-UTRAN interworking, pp. 1-27.

* cited by examiner

METHOD AND WIRELESS COMMUNICATION DEVICE FOR IDLE MODE MOBILITY MANAGEMENT

TECHNICAL FIELD

The present technology relates to the field of radio communication, particularly to a method for a method for idle mode mobility management in a wireless communication device operating in compliance with dual radio access technologies. The technology also relates to a wireless communication device, a computer program and a storage medium.

BACKGROUND

The user equipments (UEs) that are idle tune in to the base station at predetermined occasions, paging occasions, to check whether they are getting paged by the network. The reason for getting paged may for instance be that there is an incoming call for the UE to receive.

While in idle mode the UE is handling the mobility autonomously using neighbor cell information provided by the network. If the current serving cell becomes weak and there is a stronger neighbor cell, the UE will change serving cell to the stronger neighbor. During this so called cell reselection the UE is not monitoring paging and hence may miss if getting paged at that moment. To prevent that the paging is missed due to interruption caused by cell reselection, radio access networks are usually repeating the paging one or more times until the UE responds.

All base stations in a so called location (tracking) area for which the UE has registered are paging the UE. When the UE is reselecting to a cell in another location (tracking) area, e.g. due to crossing some geographical boundary, or changing to another radio access technology, it has to update the network on in which area it is, in what is called a Location (Tracking) Area Update procedure. During the time which the UE is updating the location (tracking) area, the radio access network will have outdated information on in which area to page the UE. To prevent that the paging is missed due to outdated location information, if the UE does not respond to paging in the registered location (tracking) area, the radio access network usually repeats the paging in adjacent location (tracking) areas.

The paging occasions follow a so called paging cycle which is configured by the radio access network node. The paging cycle length also depends on the radio access technology; see below for idle mode paging cycles for Global System for Mobile Communications (GSM), Wideband Code Division Multiple Access (WCDMA), Time Division-Synchronization Code Division Multiple Access (TD-SCDMA) and Universal Mobile Telecommunication Standard, Long Term Evolution (UMTS-LTE):

GSM: 471, 706, 942, 1177, 1412, 1648, 1883, 2118 ms
WCDMA: 640, 1280, 2560, 5120 ms
TD-SCDMA: 640, 1280, 2560, 5120 ms
LTE: 320, 640, 1280, 2560 ms

Circuit switched fallback (CSFB) is an interim solution for supporting voice calls to UEs that are connected to LTE until voice over LTE (VoLTE) and single radio voice call continuity (SRVCC) are supported in the networks. The UE can get paged in the LTE system on an incoming call in a legacy system, and can get redirected to the legacy Radio access technology (RAT) such as GSM, WCDMA, TD-SCDMA, etc. This means that a UE can safely camp on or be connected to an LTE cell without missing any incoming calls.

The UE gets informed about whether CSFB is supported in the LTE cell when carrying out a combined registration for circuit switched (CS) and packet switched (PS) services. If CSFB is not supported, the registration will fail. The standard-compliant UE action when CS is not supported is to deactivate the support for LTE.

CSFB requires upgrades of legacy networks, hence in areas where LTE networks are rolled out there might not always be CSFB support from the beginning. How fast and whether at all it will be supported depends on whether the operator is willing to invest in the legacy network. Various proprietary solutions have been introduced to allow UEs to camp on or be connected to LTE while at the same time being camped on a legacy RAT to monitor CS paging.

Simultaneous GSM/LTE (SG-LTE)

SG-LTE is a solution that allows simultaneous GSM and LTE activities by having two separate radios and one or two basebands. The UE can be engaged in LTE data traffic and at the same time support a voice call in GSM. A device supporting SG-LTE thus does rely on CSFB to allow camping on or being connected to LTE. SG-LTE can be considered a special case of dual Subscriber Identity Module (SIM) dual activity (DSDA) where both SIMs are from the same operator (physically a single SIM).

Single Radio-LTE (SR-LTE)

In SR-LTE a single radio is shared between LTE and a legacy RAT in a time-division manner. The UE is connected to or camping on LTE while at the same time camping on a legacy RAT. When for example monitoring paging in the legacy RAT, reading system information, carrying out mobility measurements, doing a location area update, or receiving a call, the radio is handed over to the legacy RAT and any LTE activities are getting punctured. A device supporting SR-LTE does not rely on CSFB to allow camping on or being connected to LTE. SR-LTE can be considered a special case of dual SIM dual standby (DSDS) where both SIMs are from the same operator (physically a single SIM).

Monitoring Legacy RAT Using Available Additional Receiver

A UE capable of carrier aggregation may use an available receiver otherwise reserved for a secondary component carrier to monitor paging, carry out mobility measurements and read system information in the legacy RAT. As long as there is large enough separation between LTE uplink (UL) and legacy RAT downlink (DL) spectrum, the legacy RAT can be received concurrently with LTE transmissions on the UL. Hence for this case the legacy RAT can be monitored without any impact on LTE performance.

However, in case that the spectral separation between LTE UL and legacy RAT DL is not sufficient, collisions between LTE UL transmissions and legacy RAT reception has to be avoided in order to prevent high energy leaking from the transmitter to the receiver and destroying the signal to be received. In many cases it will mean that LTE UL transmissions have to be skipped when in conflict with legacy RAT activities.

Depending on capabilities of the baseband and whether dual transmissions can be supported, it may also be possible to support functionality similar to SG-LTE with a single radio with two or more receivers.

For SR-LTE as well as for the approaches above, in case of too small spectrum separation, the LTE connection will be punctured at least partially during the time the legacy RAT is received.

Undesirably, when puncturing the LTE connection there will be a direct throughput loss due to that scheduled transmissions to and/or from the UE cannot be carried out since the radio is tuned to another frequency, and also, due to that hybrid automatic request (HARQ) acknowledges (ACKs) for received transport blocks immediately before the created gap cannot be transmitted, and hence the base station may retransmit the data although successfully received by the UE. The puncturing may also have an impact on the residual block error rate (BLER) leading to retransmissions in higher layers such as radio link control (RLC).

Depending on the link adaptation algorithm used by the base station, missed ACKs and/or channel quality reports due to the puncturing may lead to that the base station is lowering the modulation and coding scheme (MCS) when scheduling the UE—a so called backoff. As a result, the transmissions become more robust at the expense of a reduced throughput.

SUMMARY

It's an object of the present invention to resolve or alleviate at least one of the problems mentioned above.

A first aspect of present disclosure is a method of a wireless communication device adapted to operate in compliance with a first radio access technology in association with a first network and in compliance with a second radio access technology in association with a second network. The method comprises reading a first information comprised in a first signal received from a first network node of the first network using the first radio access technology; and if the first information comprises a first list of neighboring cells for the second radio access technology, using the first list of neighboring cells to provide idle mode mobility management for the second radio access technology in the second network.

For example, by reading GSM neighbor cell information from the LTE cell rather than from the GSM cell, the puncturing of the ongoing LTE connection due to the otherwise communication with the GSM cell will be reduced. As a result, the throughput in the LTE connection will not be impacted.

A second aspect of the present disclosure is an arrangement for a wireless communication device adapted to operate in compliance with a first radio access technology in association with a first network and in compliance with a second radio access technology in association with a second network. The arrangement comprising a processor adapted to executing the steps of the method described above.

A third aspect of the present disclosure is a computer program product comprising a computer readable medium, which has a computer program comprising program instructions, the computer program being loadable into a data-processing unit and adapted to cause execution of the method described above.

A fourth aspect of the present disclosure is an arrangement for a wireless communication device adapted to operate in compliance with a first radio access technology in association with a first network and in compliance with a second radio access technology in association with a second network. The arrangement comprises an information reading unit and a mobility management unit. The information reading unit is adapted to read first information comprised in a first signal received from a first network node of the first network using the first radio access technology. The mobility management unit is adapted to, if the first information comprises a first list of neighboring cells for the second radio access technology, use the first list of neighboring cells to provide idle mode mobility management for the second radio access technology in the second network.

A fifth aspect of the present disclosure is a wireless communication device comprising the arrangement described above.

A sixth aspect of the present disclosure is a network server adapted to hold historic records regarding detection, by one or more detecting devices, of neighboring cells of a second radio access technology. If first information comprised in a first signal received by the wireless communication device from a first network node of a first network using a first radio access technology does not comprise a first list of neighboring cells for the second radio access technology, the historic records are for determining, at a wireless communication device, whether or not to perform mobility measurements comprising detection of neighboring cells for the second radio access technology in the second network.

A seventh aspect of the present disclosure is a system comprising a network server and a wireless communication device. The network server is adapted to hold historic records regarding detection, by one or more detecting devices, of neighboring cells of a second radio access technology. The wireless communication device is adapted to operate in compliance with a first radio access technology in association with a first network and in compliance with a second radio access technology in association with a second network, and the wireless communication device comprises a processor adapted to cause reading of first information comprised in a first signal received from a first network node of the first network using the first radio access technology. If the first information does not comprise a first list of neighboring cells for the second radio access technology, the processor is adapted to cause reception of the historic records from the network server and, if the historic records fulfill one or more criteria, performing of mobility measurements comprising detection of neighboring cells for the second radio access technology in the second network and using of the mobility measurements to provide idle mode mobility management for the second radio access technology in the second network.

BRIEF DESCRIPTION OF THE DRAWINGS

The technology will now be described, by way of example, based on embodiments with reference to the accompanying drawings, wherein.

DETAILED DESCRIPTION

Figure 1:
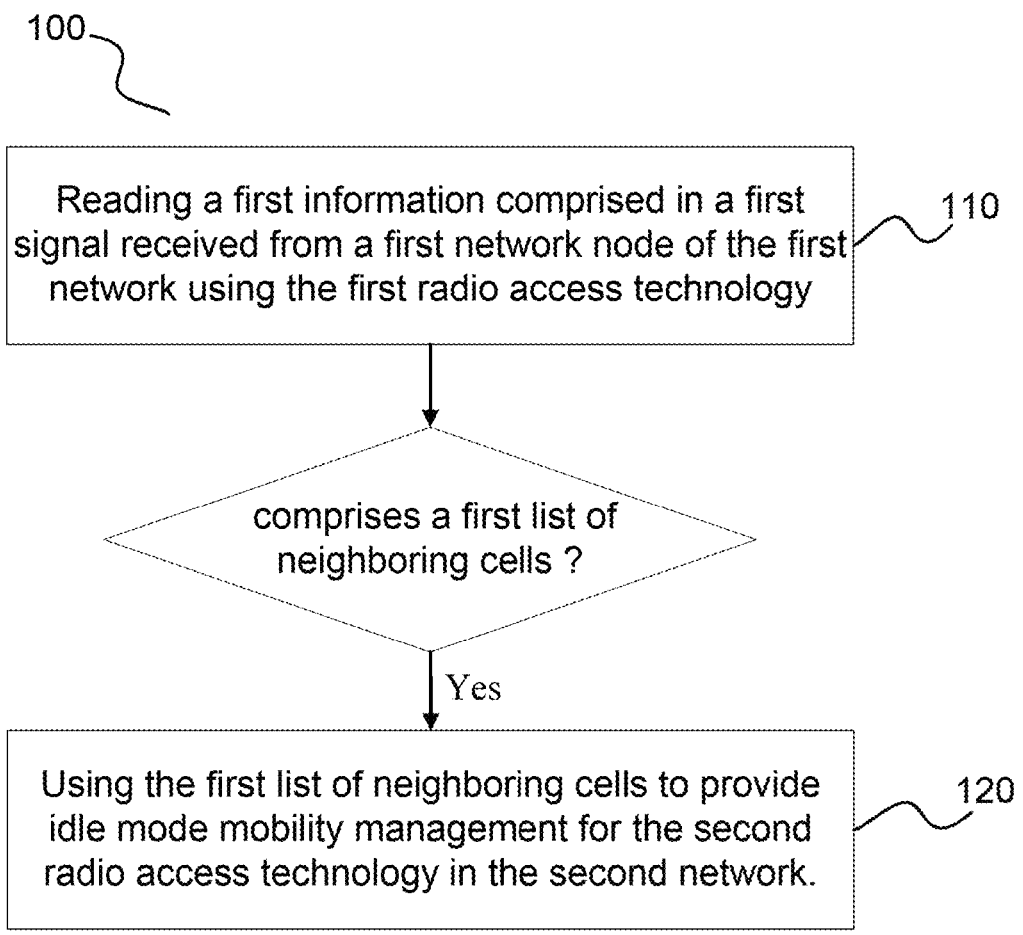
FIG. 1 illustrates a flowchart of implementing idle mode mobility management by a wireless communication device operating in compliance with dual radio access technologies in accordance with an embodiment.

Embodiments herein will be described more fully hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Examples of hardware that may be employed in various embodiments of the present disclosure include, but are not limited to, conventional microprocessors, application specific integrated circuits (ASICs) and field-programmable gate arrays (FPGAs). Furthermore, the present technology may take the form of a computer program on a computer-usable or computer-readable storage medium having computer-usable or computer-readable program code embodied in the medium for use by or in connection with an instruction execution system. In the context of this document, a computer-usable or computer-readable storage medium may be any medium that may contain, store, or is adapted to communicate the program for use by or in connection with the instruction execution system, apparatus, or device.

Embodiments herein will be described below with reference to the drawings.

FIG. 1 illustrates a flowchart of implementing idle mode mobility management by a wireless communication device operating in compliance with dual radio access technologies in accordance with an embodiment.

The method 100 can be performed by wireless communication device, which operates in compliance with a first radio access technology in association with a first network and in compliance with a second radio access technology in association with a second network. The radio access technology may comprise, but not limited to, GSM, WCDMA, TD-SCDMA, LTE, and the like. Herein, by way of example, the LTE is used to represent the first radio access technology and the GSM is used to represent the second radio access technology. Now the process of the embodiment will be described in detail with reference to FIG. 1.

In step 110, the method 100 reads a first information comprised in a first signal received from a first network node of the first network using the first radio access technology. For example, the method 100 may read the first information comprised in the System Information Block, type 7—SIB7 received from the cell of the LTE network.

If the first information comprises a first list of neighboring cells for the second radio access technology, the method 100 uses the first list of neighboring cells to provide idle mode mobility management for the second radio access technology in the second network as step 120. For example, the method may find the list of neighboring cells for GSM from the LTE SIB7, and use this list to provide idle mode mobility management for the GSM in the GSM network.

Herein, by way of example, the radio access technology pair LTE and GSM are be used to set forth the present technology. It should be appreciated that the present disclosure is applicable to other radio access technology pairs, such as WCDMA versus GSM, TD-SCDMA versus GSM, and LTE versus TD-SCDMA. For example, if the UE is connected to a WCDMA cell and want to simultaneously camp on a GSM cell, then the UE can use GSM neighbor cell information from the WCDMA cell's system information for the GSM idle mode mobility.

Figure 2:
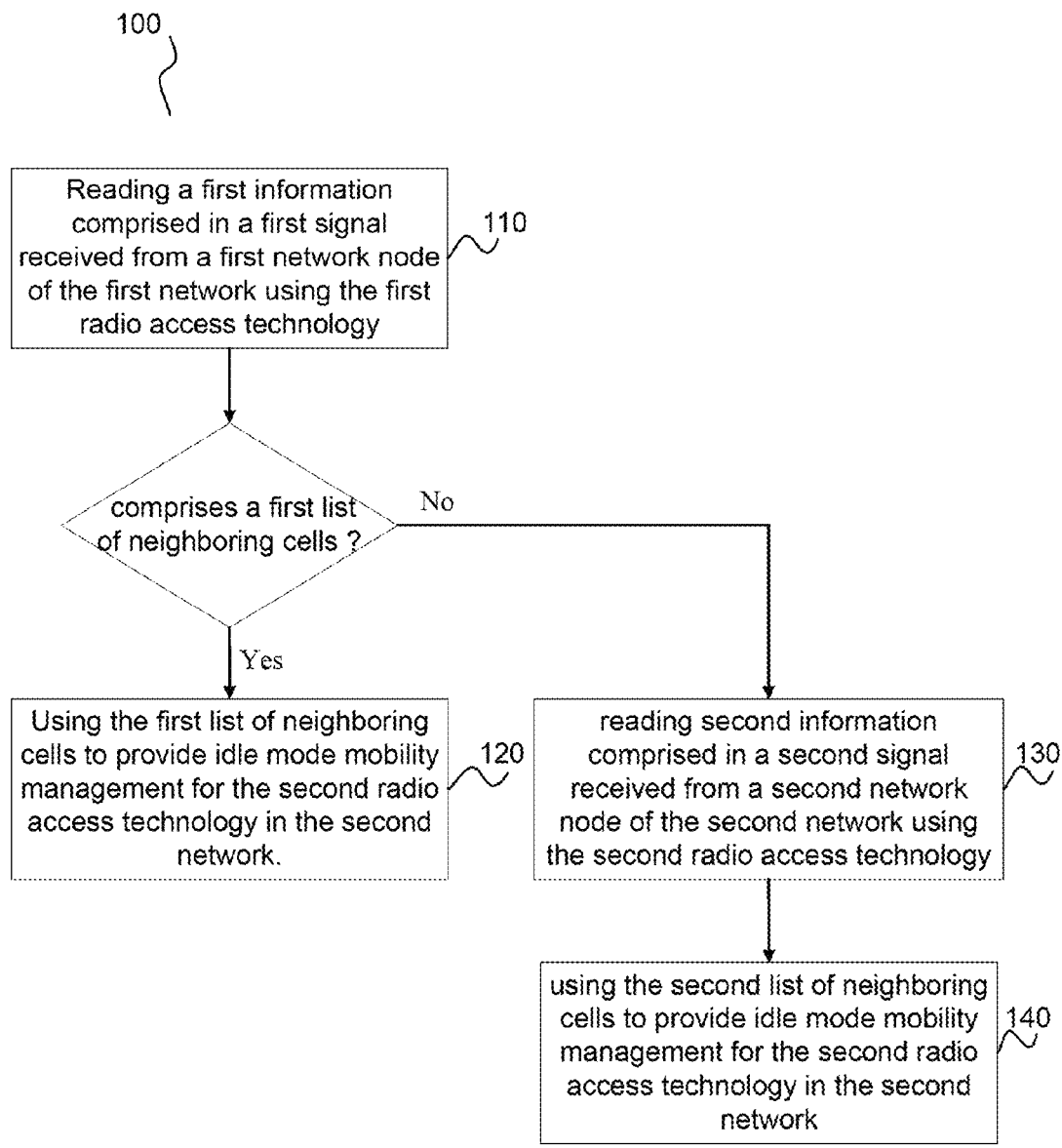
FIG. 2 schematically illustrates a flowchart of implementing idle mode mobility management by a wireless communication device operating in compliance with dual radio access technologies in accordance with another embodiment.

Additionally or alternatively, as illustrated in FIG. 2, if the first information does not comprise a first list of neighboring cells for the second radio access technology, the method 100 may read a second information comprised in a second signal received from a second network node of the second network using the second radio access technology at step 130. The second information comprises a second list of neighboring cells for the second radio access technology. Then, at step 140, the method 100 may use the second list of neighboring cells to provide idle mode mobility management for the second radio access technology in the second network. Specifically, when the information on GSM neighboring cells can not be found in the LTE SIB7, the method will obtain the information on GSM neighboring cells from the GSM network itself. For example, the second information may be comprised in one or more of the messages System Information 2, System Information 2bis, System Information 2ter—SI2, SI2bis, SI2ter, respectively.

Alternatively, the method 100 may monitor paging signals from the second network using the second radio access technology.

Alternatively, the first radio access technology is packet switched oriented and the second radio access technology is circuit switched oriented and wherein the method is performed in response to a determination that the first network does not support a circuit switched fallback operation.

Figure 3:
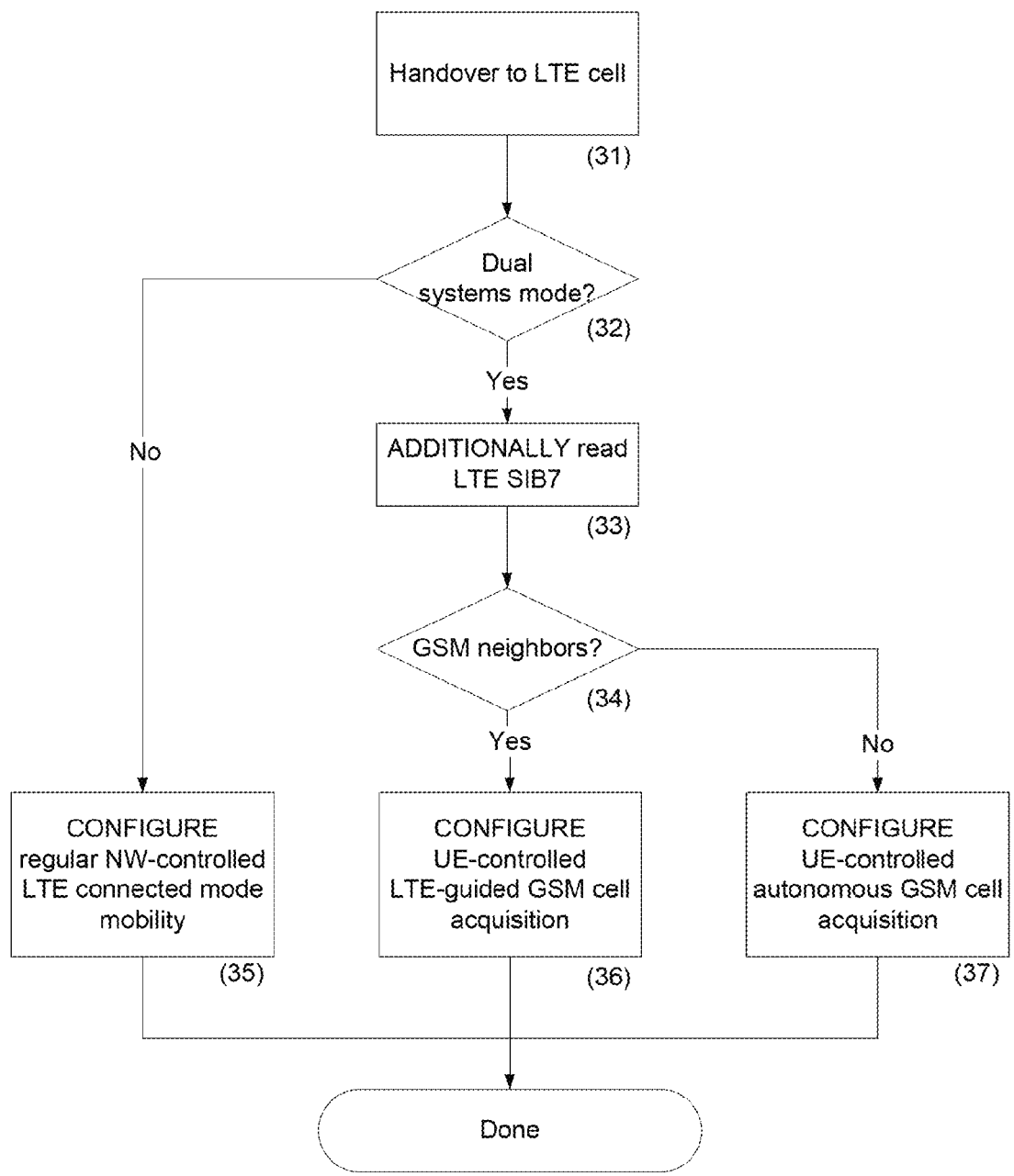
FIG. 3 schematically illustrates a flowchart of implementing idle mode mobility management for GSM in LTE connected mode in accordance with an embodiment.
Figure 4:
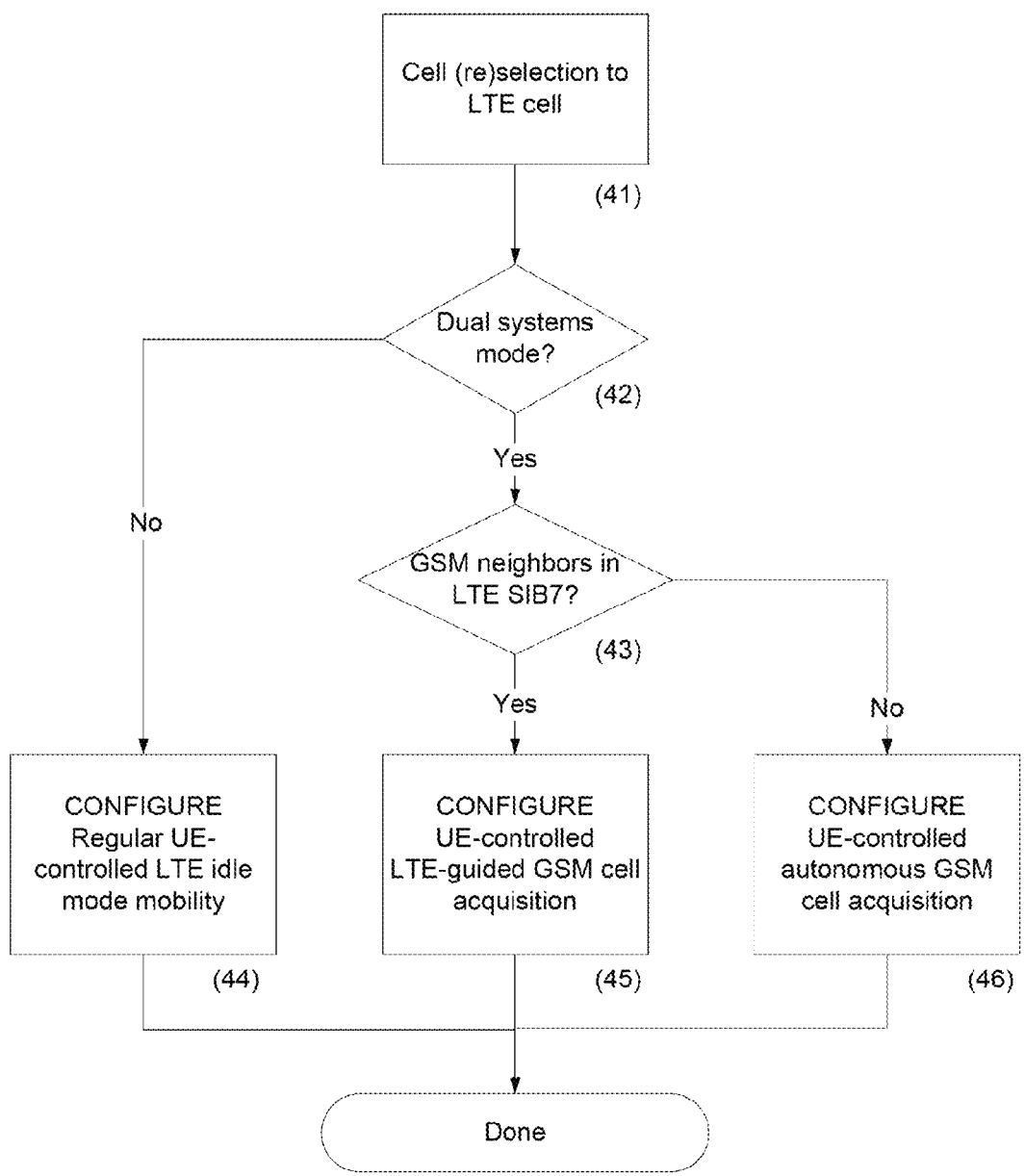
FIG. 4 schematically illustrates a flowchart of implementing idle mode mobility management for GSM in LTE idle mode in accordance with an embodiment.

In order to clarify the present disclosure, several further specific embodiments will be introduced with reference to the FIG. 3 and FIG. 4. In these embodiments, the first radio access technology is LTE, while the second radio access technology is GSM.

In an embodiment, when the wireless communication device is operating in a connected mode of the first radio access technology, and in connection with a handover to a cell of the first network, the method will be performed in the way as illustrated in FIG. 3.

In LTE connected mode, when there is a handover between LTE cells at 31, the wireless communication device, e.g. a user equipment (UE), checks whether to operate in single or dual systems mode (e.g. LTE plus GSM mode) at 32. The trigger is if CS service cannot be supported in the LTE target cell, but it also depends on whether the UE is configured to support dual systems, and whether it is to be supported in the Public Land Mobile Network (PLMN). If CS service is provided as illustrated in the FIG. 5(*a*), or if dual systems is not to be supported (UE software is not configured to support dual systems in this (or any) PLMN) at 32, regular 3rd Generation Partnership Project (3GPP) compliant LTE connected mode mobility is configured at 35 by which there is no support for simultaneous monitoring of GSM paging.

Figure 5:
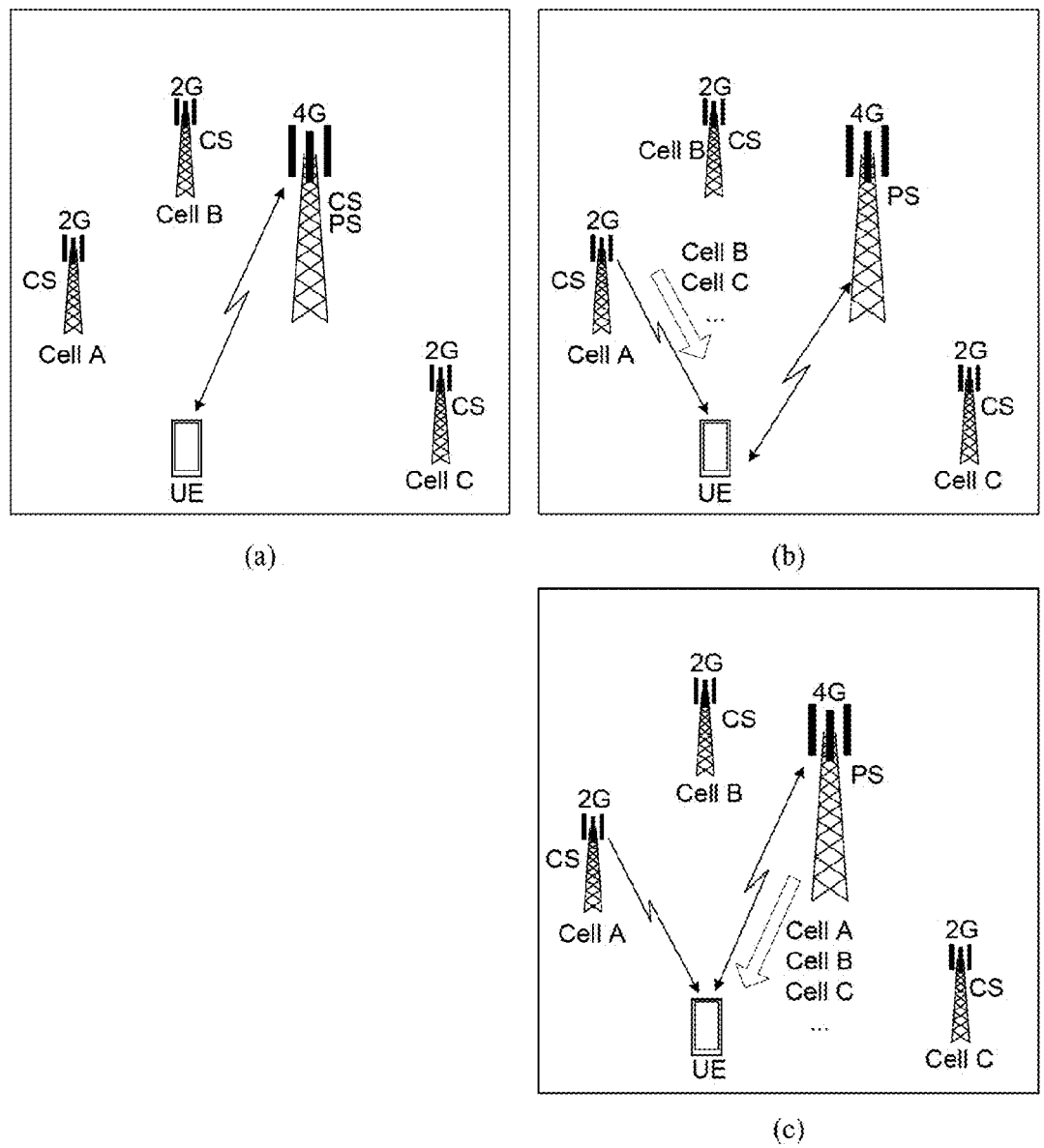
FIG. 5 illustrates schematic view of exemplary scenarios in implementing an embodiment of the present invention.

If dual systems are to be supported at 32, the UE additionally reads LTE SIB7 if available at 33. This is not to be read in connected mode in regular UE implementations following the standard outlined in 3GPP TS 36.331. If there are GSM neighbors in the LTE system information at 34, as illustrated in FIG. 5(*c*), the UE configures simultaneous UE-controlled GSM idle mode mobility using GSM neighbor cell list provided by LTE rather than by GSM at 36. This way the UE avoids interrupting ongoing LTE Reception (Rx) and/or Transmission (Tx) for reading GSM SI2, SI2bis, and/or SI2ter which contain GSM neighbor cells.

If LTE does not provide GSM neighbor cell list at 34, the UE configures UE-controlled GSM idle mode mobility at 37 where GSM is self-contained and where ongoing LTE Rx and/or Tx have to be interrupted in order to acquire GSM SI2, SI2bis and/or SI2ter, as illustrated in FIG. 5(*b*).

In a further embodiment, when the wireless communication device is operating in an idle mode of the first radio access technology, and in connection with a cell reselection to a cell of the first network, wherein the cell reselection causes a change of tracking area, the method will be performed in the way as illustrated in FIG. 4.

In LTE idle mode, when carrying out an intra-LTE cell reselection to a cell in a new tracking area at 41, the wireless communication device (e.g. a UE) checks whether to operate in dual systems mode at 42. The trigger is when the UE tries a combined CS&PS attach, and fails due to lack of CS support. The decision depends on whether the UE software is configured to support dual systems, and if so whether it is to be supported in the particular PLMN. If combined CS&PS attach is successful, if the software is configured not to support dual systems, or if it is not to be supported in the current PLMN at 42, regular 3GPP compliant UE-controlled LTE idle mode mobility including inter-RAT mobility (to an extent supported by the network) is configured at 44, by which there is no support for simultaneous monitoring of GSM paging.

If dual systems are to be supported at 42, the UE checks whether LTE SIB7 has provided any GSM neighbor cell information at 43. LTE SIB7 is to be read as part of regular LTE idle mode procedures (3GPP TS 36.331 clause 5.2.2.3).

If GSM neighbor cell list is provided by LTE at 43, the UE configures simultaneous UE-controlled GSM idle mode mobility using GSM neighbor cell list provided by LTE rather than by GSM at 45. This way the UE can reduce the activities during idle mode and thereby avoid otherwise redundant activities since LTE SIB7 anyway is to be read.

If LTE does not provide GSM neighbor cell list at 43, the UE configures UE-controlled GSM idle mode mobility at 46 where GSM is self-contained and thus acquires information on GSM neighbor cells from GSM system information.

As indicated, the UE can use inter-RAT neighbor cell information from LTE system information instead of reading corresponding information from the legacy RAT, i.e. GSM. Concretely, the UE can read LTE SIB7 without penalty on PS throughput, instead of reading GSM SI2, SI2bis, and SI2ter which would result in additional puncturing to what is required for monitoring paging. The advantage is that the need for puncturing the UE is minimized.

Optionally, the method may perform mobility measurements comprising detection of neighboring cells for the second radio access technology in the second network, and use the mobility measurements to provide idle mode mobility management for the second radio access technology in the second network. In an embodiment, if historic records regarding the second radio access technology fulfill one or more criteria, the mobility measurements for the second radio access technology will be performed. For example, if the historic records has expired for a predetermined period of time, and/or the number of historic records is smaller than a predetermined threshold, the method 100 perform the mobility measurements.

Optionally, the one or more criteria may further comprise a criterion that the historic records comprise a previous detection, by a detecting device in a specific location, of one or more neighboring cells for the second radio access technology. The specific location is determined as a current cell of the first network and the previous detection has occurred within a certain time window. The detecting device may be the wireless communication device and the historic records are held by the wireless communication device. Alternatively, the detecting device may be any in a set of wireless communication devices and the historic records are held by a network server. In the case that, the historic records are held by the network server, the method may upload the detection of neighboring cells to a network server to update historic records held by the network server.

The present disclosure presents an arrangement for a wireless communication device adapted to operate in compliance with a first radio access technology in association with a first network and in compliance with a second radio access technology in association with a second network. The arrangement comprises a processor. The processor causes reading of first information comprised in a first signal received from a first network node of the first network using the first radio access technology. If the first information comprises a first list of neighboring cells for the second radio access technology, the processor causes using of the first list of neighboring cells to provide idle mode mobility management for the second radio access technology in the second network.

Additionally or alternatively, if the first information does not comprise a first list of neighboring cells for the second radio access technology, the processor may cause reading of second information comprised in a second signal received from a second network node of the second network using the second radio access technology, the second information may comprise a second list of neighboring cells for the second radio access technology; and then the processor may cause using of the second list of neighboring cells to provide idle mode mobility management for the second radio access technology in the second network.

Optionally, the processor may initiate the reading of the first information, when the wireless communication device is operating in an idle mode of the first radio access technology, and in connection with a cell reselection of the wireless communication device to a cell of the first network, wherein the cell reselection causes a change of tracking area.

Optionally, the processor may initiate the reading of the first information, when the wireless communication device is operating in a connected mode of the first radio access technology, and in connection with a handover of the wireless communication device to a cell of the first network.

Optionally, the processor may further cause monitoring of paging signals from the second network using the second radio access technology.

Optionally, the first radio access technology is packet switched oriented and the second radio access technology is circuit switched oriented. As such, the processor may initiate the reading of the first information in response to a determination by the wireless communication device that the first network does not support a circuit switched fallback operation.

Optionally, the processor may cause performing of mobility measurements comprising detection of neighboring cells for the second radio access technology in the second network, and using of the mobility measurements to provide idle mode mobility management for the second radio access technology in the second network. In an embodiment, the processor may cause performing of the mobility measurements in the case that historic records regarding the second radio access technology fulfill one or more criteria. Optionally, the processor may further cause uploading of the detection of neighboring cells to a network server to update historic records held by the network server.

Figure 6:
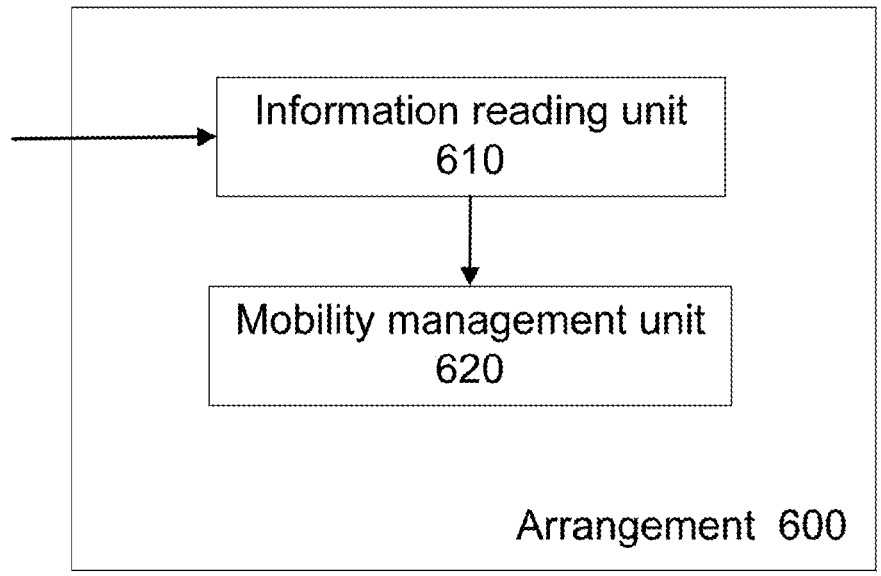
FIG. 6 illustrates a block view of an arrangement implementing idle mode mobility management in accordance with an embodiment.

The present disclosure further discloses a further arrangement 600, as illustrated in FIG. 6, for a wireless communication device adapted to operate in compliance with a first radio access technology in association with a first network and in compliance with a second radio access technology in association with a second network. As shown, the arrangement 600 comprises an information reading unit 610 and a mobility management unit 620.

The information reading unit 610 reads first information comprised in a first signal received from a first network node of the first network using the first radio access technology.

If the first information comprises a first list of neighboring cells for the second radio access technology, the mobility management unit 620 uses the first list of neighboring cells to provide idle mode mobility management for the second radio access technology in the second network.

Additionally or alternatively, if the first information does not comprise a first list of neighboring cells for the second radio access technology, the information reading unit may read second information comprised in a second signal received from a second network node of the second network using the second radio access technology. The second information comprises a second list of neighboring cells for the second radio access technology. As such, the mobility management unit 620 may use the second list of neighboring cells to provide idle mode mobility management for the second radio access technology in the second network.

Figure 7:
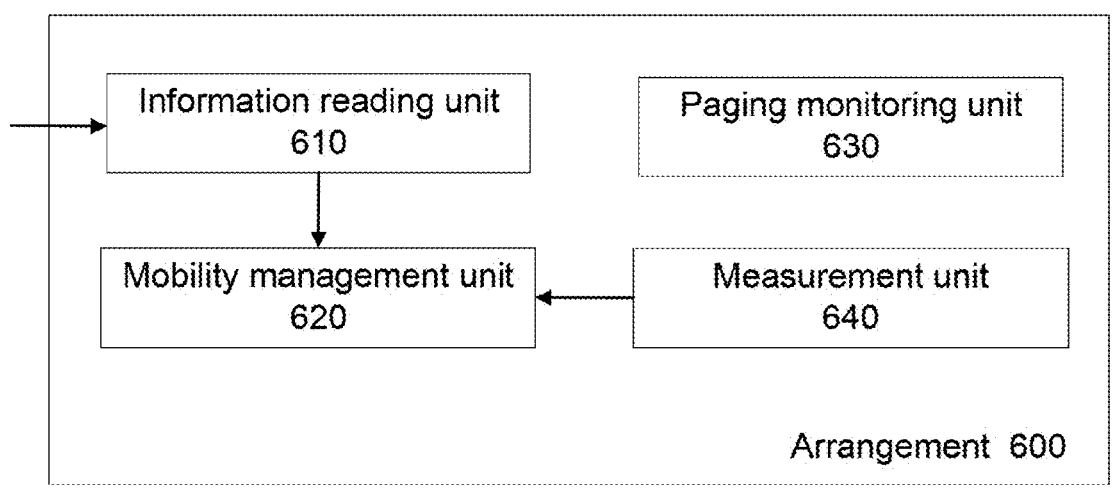
FIG. 7 illustrates a block view of an arrangement implementing idle mode mobility management in accordance with another embodiment.

Optionally, the arrangement 600 may further comprise a paging monitoring unit 630 as illustrated in FIG. 7. The paging monitoring unit 630 may monitor paging signals from the second network using the second radio access technology.

Optionally, the arrangement 600 may further comprise a measurement unit 640, as illustrated in FIG. 7. If the first information does not comprise a first list of neighboring cells for the second radio access technology, the measurement unit 640 may perform mobility measurements comprising detection of neighboring cells for the second radio access technology in the second network. Then, the mobility management unit 620 may use the mobility measurements to provide idle mode mobility management for the second radio access technology in the second network.

The present disclosure also presents a wireless communication device which comprises the arrangement as described above. The wireless communication device refers to a device being capable of communicating with other devices wirelessly, including but not limited to, smart phones, cellular phone, Personal Digital Assistant (PDA), and the like.

The present disclosure further presents a network server as used by the method and arrangement as described above. The network server holds historic records regarding detection, by one or more detecting devices, of neighboring cells of a second radio access technology. If first information comprised in a first signal received by the wireless communication device from a first network node of a first network using a first radio access technology does not comprise a first list of neighboring cells for the second radio access technology, the historic records are for determining, at a wireless communication device, whether or not to perform mobility measurements comprising detection of neighboring cells for the second radio access technology in the second network.

Figure 8:
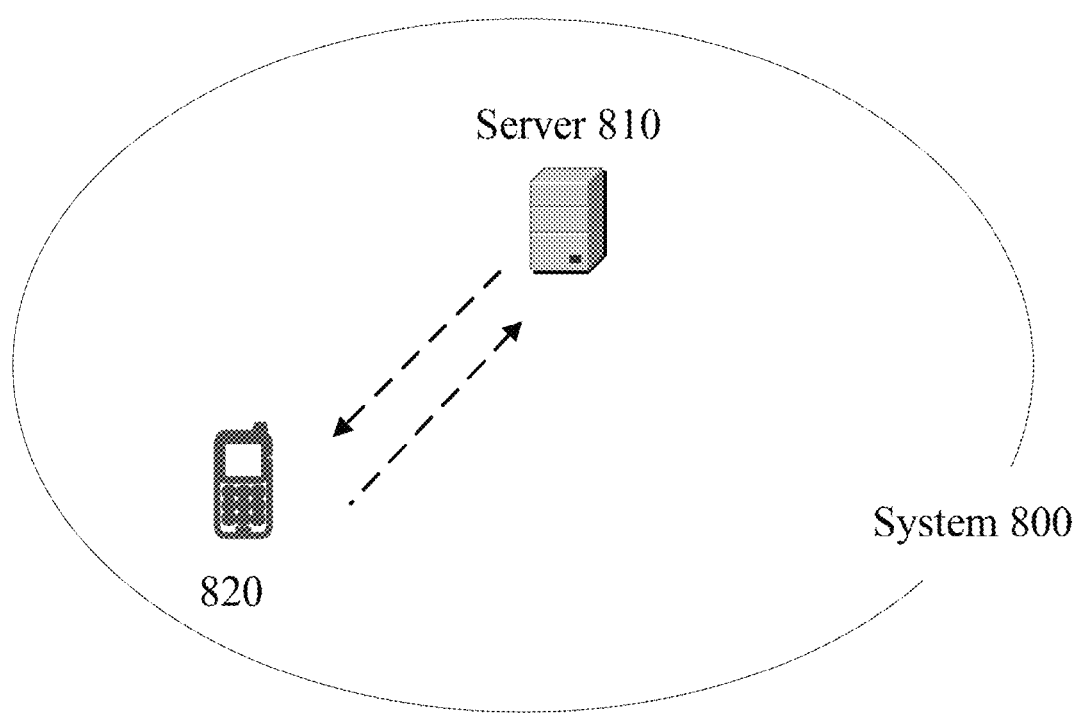
FIG. 8 illustrates a schematic view of a system used to implement idle mode mobility management in accordance with an embodiment.

The present disclosure also presents a system 800 as illustrated in FIG. 8. As shown, the system 800 comprises a network server 810 and a wireless communication device 820.

The network server 810 holds historic records regarding detection, by one or more detecting devices, of neighboring cells of a second radio access technology.

The wireless communication device 820 operates in compliance with a first radio access technology in association with a first network and in compliance with the second radio access technology in association with a second network. The wireless communication device comprises a processor. The processor causes reading of first information comprised in a first signal received from a first network node of the first network using the first radio access technology. If the first information does not comprise a first list of neighboring cells for the second radio access technology, the processor causes reception of the historic records from the network server 810. If the historic records fulfill one or more criteria, then the processor causes performing of mobility measurements comprising detection of neighboring cells for the second radio access technology in the second network and using of the mobility measurements to provide idle mode mobility management for the second radio access technology in the second network.

By way of example, only one wireless communication device 820 is shown in the system. It should be understood that the system may comprise one or more wireless communication devices 820, which may receive the historic records from the network server 810.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method of a wireless communication device adapted to operate in compliance with a first radio access technology in association with a first network and in compliance with a second radio access technology in association with a second network, the method comprising:
   reading a first information comprised in a first signal received from a first network node of the first network using the first radio access technology;
   determining whether the first information comprises a first list of neighboring cells for the second radio access technology; and
   if the first information comprises the first list of neighboring cells for the second radio access technology, using the first list of neighboring cells received from the first network node to provide idle mode mobility management for the second radio access technology in the second network,
   wherein the method is performed while the wireless communication device is concurrently in communication with the first network and with the second network.

2. The method of claim 1 wherein the method is performed:
   while the wireless communication device is operating in an idle mode of the first radio access technology; and
   in connection with a cell reselection to a cell of the first network, wherein the cell reselection causes a change of tracking area.

3. The method of claim 1 wherein the method is performed:
   while the wireless communication device is operating in a connected mode of the first radio access technology; and
   in connection with a handover to a cell of the first network.

4. The method of claim 1 further comprising monitoring paging signals from the second network using the second radio access technology.

5. The method of claim 1 wherein the first radio access technology is packet switched oriented and the second radio access technology is circuit switched oriented and wherein the method is performed in response to a determination that the first network does not support a circuit switched fallback operation.

6. The method of claim 1 further comprising, if the first information does not comprise a first list of neighboring cells for the second radio access technology:
   reading a second information comprised in a second signal received from a second network node of the second network using the second radio access technology, wherein the second information comprises a second list of neighboring cells for the second radio access technology; and
   using the second list of neighboring cells to provide idle mode mobility management for the second radio access technology in the second network.

7. The method of claim 6 further comprising:
   performing mobility measurements comprising detection of neighboring cells for the second radio access technology in the second network; and
   using the mobility measurements to provide idle mode mobility management for the second radio access technology in the second network.

8. The method of claim 7 wherein the mobility measurements for the second radio access technology are performed if historic records regarding the second radio access technology fulfill one or more criteria.

9. The method of claim 8 wherein the one or more criteria comprises a criterion that the historic records comprise a previous detection, by a detecting device in a specific location, of one or more neighboring cells for the second radio access technology.

10. The method of claim 9 wherein the specific location is determined as a current cell of the first network and the previous detection has occurred within a certain time window.

11. The method of claim 9 wherein:
    the detecting device is the wireless communication device and the historic records are held by the wireless communication device; or
    the detecting device is any in a set of wireless communication devices and the historic records are held by a network server.

12. The method of claim 7 further comprising uploading the detection of neighboring cells to a network server to update historic records held by the network server.

13. The method of claim 1 wherein the second radio access technology is the Global System for Mobile communication (GSM).

14. The method of claim 13 wherein the second information is comprised in one or more of the messages System Information 2, System Information 2bis, System Information 2ter, SI2, SI2bis, SI2ter, respectively.

15. The method of claim 1 wherein the first radio access technology is the Universal Mobile Telecommunication Standard, Long Term Evolution (UMTS-LTE).

16. The method of claim 15 wherein the first information is comprised in the System Information Block, type 7 (SIB7).

17. A nontransitory computer readable storage medium, having thereon a computer program comprising program instructions, the computer program being loadable into a data-processing unit and adapted to cause execution of a method when the computer program is run by the data-processing unit, wherein the method is of a wireless communication device adapted to operate in compliance with a first radio access technology in association with a first network and in compliance with a second radio access technology in association with a second network, the method comprising:
    reading a first information comprised in a first signal received from a first network node of the first network using the first radio access technology;
    determining whether the first information comprises a first list of neighboring cells for the second radio access technology; and
    if the first information comprises the first list of neighboring cells for the second radio access technology, using the first list of neighboring cells received from the first network node to provide idle mode mobility management for the second radio access technology in the second network, wherein the method is performed while the wireless communication device is concurrently in communication with the first network and with the second network.

18. An arrangement for a wireless communication device adapted to operate in compliance with a first radio access technology in association with a first network and in compliance with a second radio access technology in association with a second network, the arrangement comprising a processor adapted to cause:
   a) reading of first information comprised in a first signal received from a first network node of the first network using the first radio access technology;
   b) determining whether the first information comprises a first list of neighboring cells for the second radio access technology; and
   c) if the first information comprises the first list of neighboring cells for the second radio access technology, using of the first list of neighboring cells received from the first network node to provide idle mode mobility management for the second radio access technology in the second network,
   wherein a), b), and c) are performed while the wireless communication device is concurrently in communication with the first network and with the second network.

19. The arrangement of claim 18 wherein the processor is adapted to initiate the reading of the first information:
   while the wireless communication device is operating in an idle mode of the first radio access technology; and
   in connection with a cell reselection of the wireless communication device to a cell of the first network, wherein the cell reselection causes a change of tracking area.

20. The arrangement of claim 18 wherein the processor is adapted to initiate the reading of the first information:
   while the wireless communication device is operating in a connected mode of the first radio access technology; and
   in connection with a handover of the wireless communication device to a cell of the first network.

21. The arrangement of claim 18 wherein the processor is further adapted to cause monitoring of paging signals from the second network using the second radio access technology.

22. The arrangement of claim 18 wherein the first radio access technology is packet switched oriented and the second radio access technology is circuit switched oriented and wherein the processor is adapted to initiate the reading of the first information in response to a determination by the wireless communication device that the first network does not support a circuit switched fallback operation.

23. The arrangement of claim 18 wherein the processor is further adapted to cause, if the first information does not comprise a first list of neighboring cells for the second radio access technology:
   reading of second information comprised in a second signal received from a second network node of the second network using the second radio access technology, wherein the second information comprises a second list of neighboring cells for the second radio access technology; and
   using of the second list of neighboring cells to provide idle mode mobility management for the second radio access technology in the second network.

24. The arrangement of claim 23 wherein the processor is further adapted to cause:
   performing of mobility measurements comprising detection of neighboring cells for the second radio access technology in the second network; and
   using of the mobility measurements to provide idle mode mobility management for the second radio access technology in the second network.

25. The arrangement of claim 24 wherein the processor is further adapted to cause performing of the mobility measurements for the second radio access technology if historic records regarding the second radio access technology fulfill one or more criteria.

26. The arrangement of claim 24 wherein the processor is further adapted to cause uploading of the detection of neighboring cells to a network server to update historic records held by the network server.

27. An arrangement for a wireless communication device adapted to operate in compliance with a first radio access technology in association with a first network and in compliance with a second radio access technology in association with a second network, the arrangement comprising:
   an information reading unit adapted to read first information comprised in a first signal received from a first network node of the first network using the first radio access technology; and
   a mobility management unit adapted to determine whether the first information comprises a first list of neighboring cells for the second radio access technology, and if the first information comprises the first list of neighboring cells for the second radio access technology, to use the first list of neighboring cells received from the first network node to provide idle mode mobility management for the second radio access technology in the second network,
   wherein the information reading unit and the mobility management unit operate while the wireless communication device is concurrently in communication with the first network and with the second network.

28. The arrangement of claim 27 further comprising a paging monitoring unit adapted to monitor paging signals from the second network using the second radio access technology.

29. The arrangement of claim 27 wherein, if the first information does not comprise a first list of neighboring cells for the second radio access technology:
   the information reading unit is further adapted to read second information comprised in a second signal received from a second network node of the second network using the second radio access technology, wherein the second information comprises a second list of neighboring cells for the second radio access technology; and
   the mobility management unit is further adapted to use the second list of neighboring cells to provide idle mode mobility management for the second radio access technology in the second network.

30. The arrangement of claim 29 further comprising a measurement unit adapted to, if the first information does not comprise a first list of neighboring cells for the second radio access technology, perform mobility measurements comprising detection of neighboring cells for the second radio access technology in the second network, and wherein the mobility management unit is further adapted to use the mobility measurements to provide idle mode mobility management for the second radio access technology in the second network.

31. A wireless communication device comprising the arrangement according to claim 18.

\* \* \* \* \*